United States Patent [19]

Diaz-Arauzo

[11] Patent Number: 5,460,750
[45] Date of Patent: Oct. 24, 1995

[54] PHENOLIC RESINS AND METHOD FOR BREAKING CRUDE OIL EMULSIONS

[75] Inventor: Hernando Diaz-Arauzo, Houston, Tex.

[73] Assignee: Nalco Chemical Company, Naperville, Ill.

[21] Appl. No.: 105,025

[22] Filed: Aug. 10, 1993

[51] Int. Cl.$^6$ ............................ B01D 17/04; B01D 17/05
[52] U.S. Cl. ..................... 252/331; 252/332; 252/342; 252/358; 528/155
[58] Field of Search ........................... 252/331, 358, 252/332, 342

[56] References Cited

U.S. PATENT DOCUMENTS

| | | | |
|---|---|---|---|
| 2,430,002 | 11/1947 | De Groote et al. | 252/342 |
| 2,454,435 | 11/1948 | De Groote et al. | 252/331 |
| 2,524,889 | 10/1950 | De Groote et al. | 252/331 |
| 2,524,891 | 10/1950 | De Groote et al. | 252/331 |
| 2,758,986 | 8/1956 | Mecum | 528/101 |
| 4,299,690 | 11/1981 | Allan | 252/358 X |

OTHER PUBLICATIONS

*Designing and Selecting Demulsifiers for Optimum Field Performance Based on Production Fluid Characteristics*, Feb. 4–6, 1987, p. 459.

Primary Examiner—Richard D. Lovering
Attorney, Agent, or Firm—Robert A. Miller; James J. Drake

[57] ABSTRACT

A composition and method for breaking crude oil emulsions is disclosed. This composition is a branched, high-molecular weight condensation product of cardanol, an alkylphenol, and an aldehyde, which may be ethoxylated or otherwise derivatized using methods standard in the art. These compositions show good emulsion-breaking performance, especially when used in blends with other compositions.

4 Claims, No Drawings

PHENOLIC RESINS AND METHOD FOR BREAKING CRUDE OIL EMULSIONS

BACKGROUND OF THE INVENTION

Crude oil is produced in many fields as a water in oil emulsion. It is desirable to separate or "break" the emulsion prior to transport and processing. To this end, various surface active or "surfactant" compositions have been developed and utilized over the course of many decades. Of these surfactant compositions that have found use as emulsion breakers, the most important are the alkylene oxide derivatives of phenolic resins.

An explanation of the synthesis, properties, and use of such resins can be found in the work of DeGroote et al. See, U.S. Pat. Nos. 2,524,890; 2,524,891; 2,524,892. DeGroote teaches the use as an oil emulsion breaker of ethoxylated derivatives of phenolic resins made by the condensation of formaldehyde, cardanol (a meta-substituted phenol derived from the shells of cashew nuts); and various ortho- and para-substituted phenols. This condensation may be either acid or base catalyzed, producing resins having at least 3 and up to 7 phenolic units, whose molecular weight increases by subjecting the reaction to vacuum distillation and heating conditions. DeGroote reports preparation of phenolic resins having up to 20 phenolic units, but expresses a preference and claims for emulsion breaking purposes resins having fewer than seven phenolic groups per molecule, prepared in an acid catalyzed condensation.

As noted by DeGroote, emulsion breakers can be introduced at various points along the chain of oil production. Typically, demulsification is conducted via heater treater vessels, in which the oil is separated in the presence of heat and emulsion breaker.

Various derivatives of phenolic resins have found use as emulsion breakers. Most commonly, the resins are oxyalkylated to increase their molecular weight and the hydrophilic/lypophlic balance. The cardanol resins may be sulfonated at the double bond in the unsaturated side chain moiety. The molecular weight of the emulsion breaker may also be increased by adding an unsaturated acid anhydride (such an maleic anhydride), followed by polymerization with, e.g., acrylic acid. The preparation and properties of such derivatives are likewise known in the art.

What I believe is not known in the art, for which I seek protection and exclusivity by these Letters Patent, is the preparation of phenolic resins (and their derivatives) having a higher molecular weight (8,000–40,000) with a branched structure and a higher number of phenolic moieties per molecule (40–100) than those known in the art, and the recognition that these phenolic resins exhibit unexpectedly superior performance characteristics when used as emulsion breakers.

SUMMARY OF THE INVENTION

My invention begins with the preparation of a novel series of phenolic resins by the base catalyzed condensation of cardanol, a para-alkyl phenol, and an aldehyde. Superior results have been obtained with the hydroxide catalyzed condensation of cardanol, p-nonylphenol, and formaldehyde. By such processes, I have prepared phenolic resins having a higher molecular weight with a branched structure and a greater number of phenolic units per molecule than those of the prior art.

As with the phenolic resins of the prior art, derivatives may be prepared from the novel phenolic resins of this invention. Thus, I have successfully prepared ethylene oxide, propylene oxide, 1–2 butylene oxide, and mixed oxides derivatives wherein oxide accounts for between 20 and 80 percent of the weight of the resulting adduct. The scope of the invention is not so limited, however, as the phenolic resins of this invention should exhibit the same alkyloxidation chemistry as those of the prior art. The novel phenolic oxyalkyl resins of this invention have been sulfonated by the addition of sodium bisulfite in the presence of a free-radical initiator. Finally, unsaturated acids have been added to the phenolic hydroxides of these resins, and the resulting adduct copolymerized with acrylic acid. Although it may be possible to derivatize the phenolic groups before the base catalyzed condensation, I have chosen to derivatize the polymerized resin. Either route results in the same product, and either route would be within the scope of this invention.

Surfactants prepared from the novel, high-molecular weight phenolic resins of this invention have been successfully employed as emulsion breakers. It is common practice in the emulsion breaking art to mix together various surfactants, often of disparate composition, to obtain a blend that exhibits superior emulsion breaking properties when applied to the crude oil produced from a specific field. Bottle testing of various resin blends using the novel emulsion breakers of this invention has shown that blends which include these emulsion breakers exhibit better performance (specifically higher coalescence and greater dryness) than those blends that lack these emulsion breakers.

DETAILED DESCRIPTION OF THE INVENTION

Preparation of Phenolic Resins

This invention uses as one component of its phenolic resin a compound known as cardanol, which is derived from cashew nut shell liquid. As it occurs in nature, cashew nut shell liquid consist primarily of anacardic acid: t,0040
The name is derived from Anacardium, the genus of the tree that produces the cashew nut. Anacardic acid is decarboxylated when heated in the presence of acid, giving the meta-substituted phenol, cardanol, which is used in this invention.

The phenolic resins that are exemplified in this disclosure are the condensation products of cardanol, p-nonylphenol, and formaldehyde. However, as taught by DeGroote, phenolic resins may be prepared by the condensation of cardanol and a variety of para-substituted alkyl phenols. The examples of such phenols that have found use in the preparation of emulsion breakers include p-nonylphenol, p-amylphenol, and t-butyl phenol. Resins prepared by combining these phenols (or any other para-substituted alkyl phenols) to yield resins having a high-molecular weight and a high number of phenol moieties are all within the scope of this invention; even if not specifically exemplified.

Similarly, I have used formaldehyde as the preferred aldehyde to condense with cardanol and p-alkylphenol to produce my novel resins. Phenolic resins may, however, be produced using aldehydes other than formaldehyde. This too is taught by DeGroote. Thus, it is within the expertise of those skilled in the art to vary the aldehyde component of these novel resins, and my invention is not limited to the specific resins exemplified in this disclosure, which are all synthesized using formaldehyde as the aldehyde component.

EXAMPLE 1

The novel, branched, high-molecular weight phenolic resins of this invention may be prepared as follows, with sample component quantities listed in TABLE 1. t,0050
Nonylphenol, cardanol, half of the solvent (a high boiling aromatic solvent such as the Exxon Aromatics 150 Product), and potassium hydroxide are added to the reactor flask and stirred for 15 minutes. Para-formaldehyde is added gradually so that the solution temperature does not exceed 100° C. The reactor is then heated at 94°–98° C. for three hours; then the remainder of the solvent is added and refluxed (at about 144° C.) for two hours.

The viscosity of the resulting compositions is well within acceptable limits. For resins A and B, a Brookfield viscosity of 237.5 has been measured at room temperature, using a 2 spindle at 12 RPM. The molecular weight of the resulting resin can be measured using several different methods. One commonly accepted method measures the "relative molecular weight" using a gas chromatograph, by comparing the retention time of the polymer to that of a standard polymer of a known molecular weight. The relative molecular weights of compositions prepared by the method of EXAMPLE 1 using the quantities of TABLE 1 range from about 10,500 to 13,500. Another accepted method for measuring molecular weight is Sec-Viscometry, which entails running the polymer through a column having channels that trap smaller molecules so that larger molecules elute faster. Absolute molecular weights were measured using a Waters Associates Pump Model 510 and a Model 410 differential refractometer connected in parallel to a Viscotek Differential Viscometer Model 100. Absolute molecular weights of about 23,100–26,600 were measured for these resins.

Using the Sec-Viscometry method, one may also measure the so-called Mark-Houwink Constant, which relates intrinsic viscosity to molecular weight. A constant of 1.0 indicates a linear polymer; a lower constant indicates a more compact structure or a highly branched resin. As shown in TABLE 2, these constants range from about 0.1 to about 0.2, indicating a branched structure for these resins. t,0070

There are a variety of methods for measuring the molecular weight of a polymer, even beyond those specifically discussed in EXAMPLE 1. The claims of this patent contain limitations directed toward the molecular weight of the phenolic component of the claimed material. It should be understood that the term "molecular weight", as used in these claims, refers to the absolute molecular weight derived from the Sec-Viscometry method set forth in EXAMPLE 1, or from equivalent methods. The molecular weights computed for these compositions, which correspond to resins having up to about 100 phenol units, are substantially higher than those reported by DeGroote et al. for their compositions. They report preparing cardanol/para-alkylphenol/ formaldehyde condensation products having a molecular weight (as measured by a cryoscopic method) of approximately 4500 —corresponding to less than twenty phenol units. It is believed that the reason for this difference is that I have used a stronger base catalyst (hydroxide) in preparing these resins than that which is proposed by DeGroote (ammonia or alkyl amines).

Preparation of Alkoxylates and Other Derivatives

Derivatives of the high-molecular weight phenolic resins of this invention may be prepared in the same manner as derivatives of other phenolic resins.

Maleic acid adducts may be prepared from these resins. One convenient method for synthesizing the maleic ester entails reacting the phenolic resin with maleic anhydride in a high boiling aromatic solvent, with the pH adjusted to about 4.5–6.0 by the addition of phosphonic acid, followed by heating for six hours at 130° C. The maleic acid derivatives of these high-molecular weight resins may then be copolymerized with, e.g., acrylic acid, stearyl methacrylate, and hydroxypropyl methacrylate, using standard methods known in the art. Compositions have been further prepared in which the resulting copolymers are crosslinked with polyoxyalkyleneamines by dissolving in a high boiling aromatic solvent and heating (150° C. for three hours is sufficient).

These resins have been sulfonated at the double bond of the hydrocarbon side chain in the cardanol units. One successful synthesis involved the combination of 250g of resin, 40g of isopropanol (IPA) and 42 ml of 5M sodium bisulfite; which is stirred and heated at 75° C. while 0.77 ml of t-butyl perbenzoate is added dropwise. Sulfonation increases the surface activity of the resin by introducing charged units to its structure.

The high-molecular weight resins of this invention may be alkoxylated using standard bulk methods. I have prepared propylene oxide (PO) adducts of these resins in which the component proportions range from 80 percent resin/20 percent PO to 20 percent resins/80 percent PO. Similar adducts have likewise been prepared using ethylene oxide and mixed alkylene oxides. The oxyalkylation chemistry exhibited by these high-molecular weight resins in these syntheses is the same as that of the lower molecular weight phenolic resins of the prior art. Accordingly, this invention must be understood to encompass not only the oxyalkylates specifically disclosed herein, but also the full range of oxyalkylated phenolic resins that may be prepared using the familiar methods for such preparation known in the art.

Comparative Testing of Emulsion Breaking Ability

The superior emulsion breaking properties of surfactants derived from these novel high-molecular weight phenolic resins are illustrated in the following example.

EXAMPLE 2

Alkylene oxide derivatives of the high-molecular weight resin designated compound B in TABLE 1 were prepared having varying proportions of phenolic resin and oxide.

Low molecular weight phenolic resins are prepared by the acid-catalyzed process favored by DeGroote. To, the reaction vessel is added 140 g cardanol, 95 g p-nonylphenol, 82 g of a high boiling aromatic solvent, and 1.11 g of oxalic acid. The mixture is allowed to react for 3 hours at 94°–98° C., followed by reflux at 220°–225° C. for 2 hours. The resulting phenolic resin as a molecular weight of about 3,000—corresponding to roughly 15 phenolic units. This low molecular weight phenolic resin is designated resin D. Various alkylene oxide derivatives of this low molecular weight resin are prepared.

The emulsion breaking abilities of the resulting oxyalkylated phenolic resins (both of the high molecular weight variety claimed here and of the low molecular weight variety) are assessed and compared using "bottle tests". In these tests, ~10 ppm of the emulsion breaker are added to 100 ml of crude oil; the bottle is agitated and various measurements are made. The "hot coalescence" represents the percentage of water that is dropped from the treated emulsion when agitated in a water bath that is adjusted to a hot system plant temperature. Specifically, the higher the number the higher the response. Similarly, the "cold coalescence" property represents the quantity of water dropped from the treated emulsion when agitated at ambient temperature; and the numerical rating reported in this disclosure for this property has the same significance as that of the "hot coalescence" property. Finally, the "dryness" property indicates the proportion of water that remains in the crude oil after treatment by emulsion breaker, which is determined following separation and a centrifuge.

TABLE 3 lists the results of bottle tests conducted on Gulf Coast crude oil using various emulsion breakers. As illustrated in this table, the alkyoxylated high-molecular weight phenolic resins of this invention generally out-performed the lower molecular weight compositions of the prior art, with the propylene oxide derivatives exhibiting the most desirable emulsion breaking behavior. t,0100

The emulsion breakers are ethoxylated derivatives of high molecular weight resin B (described in TABLE 1) or of low molecular resin D. These derivatives were prepared in an alkylation plant, using standard methods. Emulsion breaker 1 is a propylene oxide derivative of emulsion breaker B prepared using 80% oxide by volume. Breaker 2 is a propylene oxide derivative of resin B using 75% oxide by volume. Breaker 3 is a propylene oxide derivative of resin B prepared using 80% oxide by weight. Breaker 4 is a propylene oxide derivative of resin D using 50% oxide by weight. Breaker 5 is a propylene and ethylene oxide derivative of resin D prepared using 20% mix oxides by weight. Breaker 6 is a propylene and ethylene oxide derivative of Epon-sorbitol prepared by using 50% mix oxides by weight.

Use In Surfactant Blends

When it is used in the field, an emulsion breaking surfactant is often mixed or blended with other emulsion breaking surfactants to produce a blend that exhibits superior or synergistic emulsion breaking properties with respect to the specific crude oil produced in a specific field. Emulsion breakers derived from the novel high-molecular weight phenolic resins of this invention exhibit excellent synergism when combined with other emulsion breakers, as is illustrated in the following example.

EXAMPLE 3

Various blends of the alkoxylated resin emulsion breakers described in EXAMPLE 2 and in TABLE 3 were prepared and bottle tests were conducted using these blends on Gulf Coast crude via the procedure described in EXAMPLE 2. The composition of these blends, as well as the results of the bottle tests, are summarized in TABLE 4. t,0120

Blend 5, which contains the novel emulsion breaker, performed better than the other blends for both platforms. It was capable of dropping water as well as or better than the other blends; and the treated crude was noticeably dryer in both cases. Improved performance was likewise observed for Blend 3 (as compared to 1 and 2) and 6, which also contain an emulsion breaker derived from the high molecular weight phenolic resins of this invention. It should be understood that this invention encompasses not only surfactants derived from the high-molecular weight phenolic resins disclosed herein, but also any blend of such surfactant with any other surfactant or material that would yield a useful emulsion breaking blend.

What is claimed:

1. A surface active composition useful in the breaking of crude oil emulsions comprising the reaction product of:
   an alkylene oxide selected from the group consisting of ethylene oxide, propylene oxide, 1,2-butylene oxide, and combinations thereof; and
   a phenolic resin comprising the hydroxide-catalyzed condensation product of cardanol, p-nonylphenol and formaldehyde, said resin having a branched structure and an average molecular weight in the range of about 8,000 to about 40,000.

2. A surface active composition useful in the breaking of crude oil emulsions comprising the reaction product of:
   a phenolic resin comprising the base catalyzed condensation product of cardanol, p-nonyl phenol and formaldehyde, said resin having a branched structure and an average molecular weight in the range of about 8,000 to about 40,000; and
   one or more adducts selected from the group consisting of sodium bisulfite, ethylene oxide, propylene oxide, 1,2-butylene oxide, maleic anhydride, acetic anhydride, succinic anhydride and phthalic anhydride.

3. A method for breaking a crude oil emulsion comprising the step of contacting said crude oil emulsion with an effective amount of a surface active composition the reaction product of:
   an alkylene oxide selected from the group consisting of ethylene oxide, propylene oxide, 1, 2-butylene oxide and combinations thereof; and a phenolic resin comprising the base catalyzed condensation product of cardanol, p-nonyl phenol and formaldehyde, said resin having a branched structure and an average molecular weight in the range of about 8,000 to about 40,000.

4. A method for breaking a crude oil emulsion comprising the step of contacting said crude oil emulsion with an effective amount of a surface active composition comprising the reaction product of:
   a phenolic resin comprising the base catalyzed condensation product of cardanol, p-nonyl phenol and formaldehyde, said resin having a branched structure and an average molecular weight in the range of about 8,000 to about 40,000; and
   one or more adducts selected from the group consisting of sodium bisulfite, ethylene oxide, propylene oxide, 1,2-butylene oxide, maleic anhydride, acetic anhydride, succinic anhydride and phthalic anhydride.

* * * * *